May 2, 1967    A. STÖCKLI ET AL    3,316,957

SPIRIT BURNER

Filed Sept. 8, 1965

INVENTORS
ALFRED STÖCKLI
MARTIN E. KISSLING
WERNER SPALINGER

By *McGlew and Toren*
    *attorneys*

United States Patent Office 3,316,957
Patented May 2, 1967

3,316,957
SPIRIT BURNER
Alfred Stöckli, Netstal, Martin E. Kissling, Urdorf, and Werner Spalinger, Ennenda, Switzerland, assignors to the firm Alfred Stockli Sohne, Netstal, Switzerland
Filed Sept. 8, 1965, Ser. No. 485,759
9 Claims. (Cl. 158—97)

The present invention relates to a spirit burner having a bottom portion, which contains material serving for absorbing a spirit storage, and a top portion mounted on said bottom portion, which has a central opening and a series of outlets for spirit vapors surrounding said central opening on a pitch circle. Such spirit burners are very popular particularly for the preparation of melted meat and cheese dishes, known under the name of fondue; however, the known burners of this type have the disadvantage of being badly regulable. Although cover means are provided for regulating the free area of said outlets and for closing said central opening, it frequently happens that the flames are ignited all over again in operation and eventually cannot be extinguished at all by the user, the spirit vapors escaping from all gaps of the movable parts. This involves the burning of table cloths and other damage. Moreover the handles of the cover means get so hot that they can no longer be gripped by the users.

The present invention has the principal object of overcoming these disadvantages and of providing a complete control of the combustion in the burners of the kind referred to.

With this and other objects in view which will become apparent later from this specification and the accompanying drawing we provide a spirit burner comprising in combination: a bottom portion, absorbent material contained in said bottom portion and in operation absorbing a storage of spirit, a top portion mounted on said bottom portion and having a central opening and a plurality of outlets for spirit vapors arranged on a pitch surrounding said central opening, a cover plate resiliently bearing on said top portion in the region of said outlets and movable between an open position and a closed position on the same, clearing in the open position said central opening and all of said outlets, and when moved into the closed position at least partly obturating temporarily each of said outlets and said central opening, and when in the closed position proper, reestablishing a pressure equalizing communication between the interior of said bottom portion and the ambient atmosphere through at least one cut-out provided in said cover plate.

These and other features of our said invention will be clearly understood from the following description of a preferred embodiment thereof, given by way of example with reference to the accompanying drawing, in which.

Figure 1:
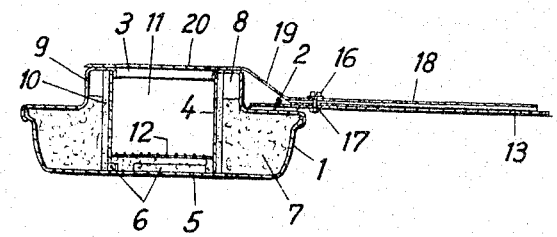
FIG. 1 is a vertical section of a spirit burner according to the invention.
Figure 2:
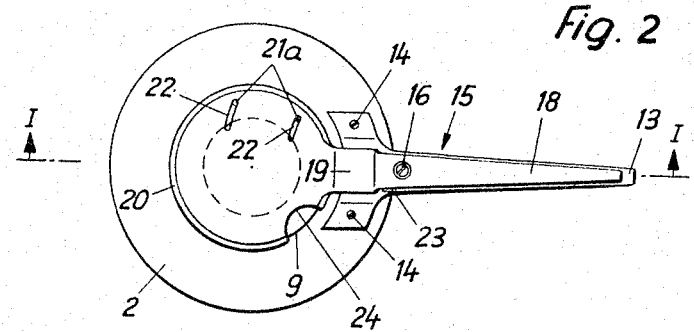
FIG. 2 is a plan view thereof in the closed position, i.e. when extinguished and not in use.

The spirit burner illustrated has a low bottom portion 1, which is fixedly connected with a top portion 2 having a large central opening 3. At this opening the top portion 2 is fixedly connected with a cylindrical shell 4, which rests on the base 5 of the bottom portion 1, and is provided at its lower end with low cut-outs 6, through which the interior of the cylindrical shell 4 is in communication with a storage chamber 7, which is bounded externally by the bottom portion 1 and top portion 2, and internally by the cylindrical shell 4. This chamber 7 is filled to the greater proportion with glass wool; a small upper part 8 of this chamber 7, which is formed by an upwardly protruding neck 9 of the top portion 2 is, however, empty except for a sleeve-shaped part of a cotton wick 10 extending into it, which rests on the outside of the shell 4 and extends over its entire length. The lowest part of the cylindrical chamber 11 enclosed by the shell 4 likewise contains glass wool, which is covered by wire netting 12.

Figure 3:
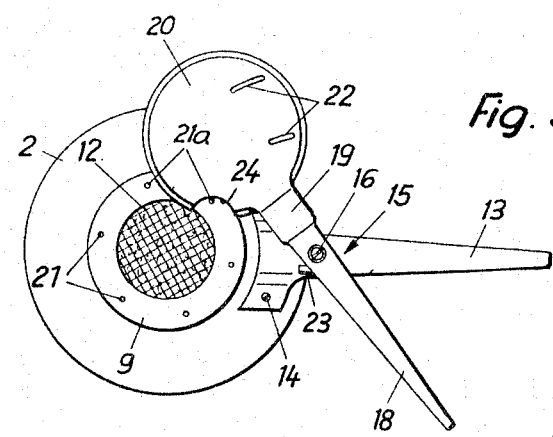
FIG. 3 is a plan view thereof in the operative position.

A handle 13 is fixed to the top portion 2 by means of two screws 14. This handle 13 consists of chromium-nickel steel alloy, in contrast to the components 1, 2 and 4, which are made in the usual way of copper sheet. Chromium-nickel steel alloy is particularly well suited for the handle 13 because of its comparatively low heat conductivity, so that it does not get too hot in the use of the burner. On the handle 13 a movable regulating lever 15 is pivotally attached by means of a screw 16, which is provided with a nut 17. The lever 15 has a handle 18, which is connected through a slight joggling 19 with a circular cover plate 20, whose diameter slightly exceeds that of the neck 9 of the top portion, on which it rests. The neck 9 is provided on top with a circle of six holes 21 (see FIG. 3), four of which are obturated in the closing position of the lever 15 by the plate 20. Two of these holes 21, namely the holes 21a, are however, not obturated in the closed position, since the plate 20 has two short slots 22, one end of each of which lies in the closed position over the holes 21a, and the other end over the central chamber 11 in the immediate vicinity of the shell 4. The regulating lever 15 likewise consists of a material of low heat conductivity, preferably of chromium-nickel steel alloy. It will be seen that in the closing position of the regulating lever 15 its handle 18 is in alignment with the handle 13 of the bottom portion. An abutment 23 provided on the handle 13 limits the pivotal movement of the lever 15 in both directions.

At the edge of the cover plate 20 a cut-out 24 is provided which in the opening position of the lever 15 clears one of the two holes 21a, although the cover plate 20 overlaps in this position the neck 9 to a considerable extent. This overlapping is required since the joggling 19 acts like a weak spring and the cover plate 20 consequently bears resiliently on the neck 9, so that in the closed position not even a narrow annular gap remains between the periphery of the cover plate and the neck 9, which might allow the escape of spirit vapors.

The burner described operates as follows: firstly, in the opening position of the regulating lever 15, spirit is filled in, which is absorbed by the glass wool contained in the storage chamber 7 and on the bottom of the central chamber 11, as well as by the cotton wick 10. Thereafter the burner is ignited by a match held above the wire netting 12, whereby firstly a weak flame develops in the central chamber 11. The heat developed by this combustion effects a gradually increasing evaporation of the spirit, so that spirit vapors escape through the holes 21, and a small circle of flames develops above the same, which soon considerably outgrow the central flame. When a pot is placed above the burner which pot contains, e.g., oil, as required for the preparation of a meat fondue (so-called "fondue bourguignonne"), when the oil has to be heated to a temperature considerably exceeding 100° C., the bottom of said pot reflects much heat onto the burner, which fact speeds up the evaporation of the spirit and thus kindles the flames increasingly. In order to prevent too strong a development of heat, the regulating lever 15 is then turned inwardly, so that its cover plate covers, e.g., the two holes 21a or even further holes 21, whereby not only the flames thereof are extinguished but, owing to the reduction of the evaporation, also the height of the flames emerging from the holes still open is reduced.

When it is desired to extinguish the burner, the regulating lever 15 is moved into the fully closing position. By this closing movement the central opening 3, too, is temporarily likewise completely closed. In the closed position proper, however, the central chamber 11 is in communication for equalisation of pressure wtih the ambient atmosphere through the inner ends of the slots 22, through the outer ends of which slots and the holes 21a the upper part 8 of the storage chamber 7 is likewise in communication with the ambient atmosphere. The spirit vapors which are still formed at a high temperature and strong evaporation, accordingly escape through the slots 22, whose edges are comparatively cold, instead of finding their way along the hot periphery of the extension 9, while applying a slight pressure on the cover plate 20, and lifting the latter slightly off, and consequently igniting again. When there is a strongly heat-reflecting pot above the burner, it may happen that even the vapors escaping at the ends of the slots 22 ignite, however, only minute flames are then formed, which by a small movement of the regulating lever in the sense of opening can be cut off from the supply of vapor and thus extinguished, whereafter they do not ignite again when closing completely the regulating lever 15. The regulating lever 15 can be operated without trouble, since it never gets too hot, which applies also to the handle 13.

The aforesaid disadvantages of the known burners have been overcome by the burner according to the invention in an astoundingly effective manner. It is clear that this burner can be used also for other purposes than the preparation of cheese- or meat-fondue dishes; however, its advantages are most pronounced when applied for the heating of dishes to very high temperatures.

While we have described herein and illustrated in the accompanying drawing what may be considered a typical and particularly useful embodiment thereof, we wish it to be understood that we do not limit ourselves to the particular details and dimensions described and illustrated; for obvious modifications will occur to a person skilled in the art.

What we claim as our invention, and desire to secure by Letters Patent, is:

1. A spirit burner, comprising in combination: a bottom portion, absorbent material contained in said bottom portion and in operation absorbing a storage of spirit, a top portion mounted on said bottom portion and having a central opening and a plurality of outlets for spirit vapors arranged on a pitch circle surrounding said central opening, a cover plate resiliently bearing on said top portion in the region of said outlets and movable between an open position and a closed position on the same, clearing in the open position said central opening and all of said outlets, and when moved into the closed position at least partly obturating temporarily each of said outlets and said central opening, and when in the closed position proper, re-establishing a pressure equalizing communication between the interior of said bottom portion and the ambient atmosphere through at least one cut-out provided in said cover plate.

2. A spirit burner as claimed in claim 1, wherein said cover plate has two slots each of which leaves one of said outlets free and with one of its ends overlaps said central opening in the closed position of said cover plate.

3. A spirit burner as claimed in claim 1, wherein said top portion has a neck provided with said central opening and said plurality of outlets, and wherein said bottom portion has a base, and comprising a cylindrical sleeve extending from the edge of said central opening to said base and having cut-outs by which the central chamber within said sleeve is in communication with the storage chamber within said bottom portion surrounding said sleeve, and comprising a sleeve-shaped cotton wick enclosing said cylindrical sleeves, said storage space being filled partly with said absorbent material except for its part formed within said neck.

4. A spirit burner as claimed in claim 1, comprising a regulating lever integral with said cover plate and a handle integral with said bottom portion, said regulating lever being pivotally mounted on said handle, and resilient means biasing said cover plate against that part of said portion, which is provided with said central opening and plurality of outlets.

5. A spirit burner as claimed in claim 4, wherein said handle of the bottom portion and said regulating lever consist of a material of low heat conductivity.

6. A spirit burner as claimed in claim 4, wherein said handle of the bottom portion and said regulating lever consist of a chromium-nickel steel alloy.

7. A spirit burner as claimed in claim 4, comprising an abutment provided on said handle, which limits the pivotal movements of said regulating lever and thus determining the opening and closing positions of the latter.

8. A spirit burner as claimed in claim 1, wherein said top portion has a neck, on which said outlets are arranged, and wherein said cover plate has a cut-out on its periphery, which serves for clearing one of said outlets in the opening position, and wherein said cover plate substantially overlaps said neck portion and outlets therein.

9. A spirit burner, its sub-combinations and principal components, constructed, arranged and operated substantially as, and for the purpose herein described with reference to the accompanying drawings.

References Cited by the Examiner

UNITED STATES PATENTS

| | | | |
|---|---|---|---|
| 766,618 | 8/1904 | Heinrichs | 158—97 |
| 2,681,056 | 6/1954 | Fischl | 126—43 |

FOREIGN PATENTS 41,319  3/1910  Austria.

FREDERICK KETTERER, *Primary Examiner.*